(12) United States Patent
Pereira et al.

(10) Patent No.: US 6,616,005 B1
(45) Date of Patent: Sep. 9, 2003

(54) MODULAR FACEPLATE ASSEMBLY FOR AN ELECTRICAL BOX

(75) Inventors: Raul G. Pereira, Cumberland, RI (US);
John J. Milner, Milford, CT (US);
Tracy H. Udelson, Westerly, RI (US);
William G. Sobieski, Guilford, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/648,554

(22) Filed: Aug. 28, 2000

(51) Int. Cl.[7] ................................................. H02G 3/14
(52) U.S. Cl. ..................... 220/241; 174/66; 439/536; 220/3.2; 220/3.3; D13/177
(58) Field of Search ......................... 220/3.8, 3.2, 3.3, 220/241, 242, 3.5; 174/66, 67, 55; D8/353; D13/177; 439/536, 537

(56) References Cited

U.S. PATENT DOCUMENTS

| | | | | | |
|---|---|---|---|---|---|
| 2,427,349 A | * | 9/1947 | Boynton | ...................... | 439/536 |
| 4,228,317 A | * | 10/1980 | Cziment | .................... | 174/67 X |
| 4,624,516 A | * | 11/1986 | White | ..................... | 439/536 X |
| 4,875,880 A | * | 10/1989 | Welch et al. | ................... | 439/65 |
| 5,092,785 A | * | 3/1992 | Chen | ............................ | 439/65 |
| 5,125,852 A | * | 6/1992 | Archer | .................... | 439/536 X |
| 5,356,311 A | * | 10/1994 | Liu | .............................. | 439/536 |
| 5,362,254 A | * | 11/1994 | Siemon et al. | ............... | 439/536 |
| 5,638,481 A | * | 6/1997 | Arnett | ......................... | 385/135 |
| 5,735,714 A | * | 4/1998 | Orlando et al. | .......... | 439/536 X |
| 5,741,158 A | * | 4/1998 | Reed et al. | .................. | 439/536 |
| 5,863,016 A | * | 1/1999 | Makwinski et al. | .......... | 220/3.5 |
| 5,897,395 A | * | 4/1999 | Arnett | ......................... | 439/536 |
| 5,961,345 A | * | 10/1999 | Finn et al. | ................... | 439/536 |
| 5,977,481 A | * | 11/1999 | Worrell et al. | ................. | 174/66 |
| 6,051,788 A | * | 4/2000 | Nichols | ........................ | 174/67 |
| 6,132,242 A | * | 10/2000 | Hall et al. | .................... | 439/532 |
| 6,234,836 B1 | * | 5/2001 | Schmidt et al. | ............. | 439/557 |
| 6,390,320 B2 | * | 5/2002 | Hurst et al. | .................. | 220/241 |

* cited by examiner

Primary Examiner—Robin A. Hylton
(74) Attorney, Agent, or Firm—Marcus R. Mickney; Alfred N. Goodman

(57) ABSTRACT

A faceplate assembly for mounting to various wall, floor or ceiling mounted electrical boxes, such as a telecommunications box, that is easily assembled and disassembled, and in which the wiring device receiving modules are readily interchangeable. The faceplate assembly includes a plate for covering the box, holes in the plate aligned with holes in the box for securing the plate to the box, at least one aperture in the plate, at least two modules adapted to fit in the at least one plate aperture, and either a blank face on the module or at least one opening in the module for accessing a wiring device receptacle in the box with a wiring device. Fasteners received in the plate openings secure the plate to the box. A module is inserted in the at least one plate aperture from the front side of the plate, allowing a module to be removed and replaced with another module without having to remove the plate from the box. A module may have a blank front face, or it may have one or more openings for accessing the wiring device receptacle in the box. The openings may be oriented in a first direction having a longer horizontal side, or oriented in a second direction with a longer vertical side, as required by the wiring device receptacles housed in the box. The module may also have a sloped front face that facilitates accessing the wiring device. The quickly and easily removable and installable modules provide a versatile faceplate assembly that may be used on a wide variety of receptacle configurations.

28 Claims, 5 Drawing Sheets

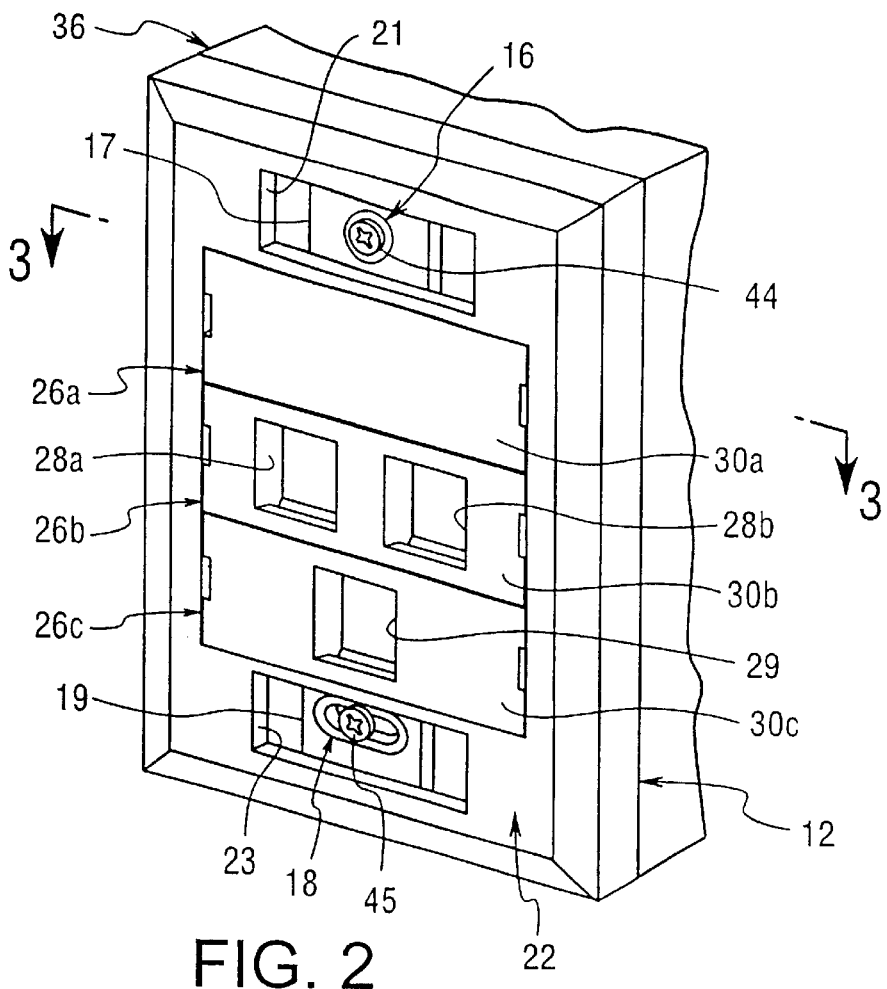
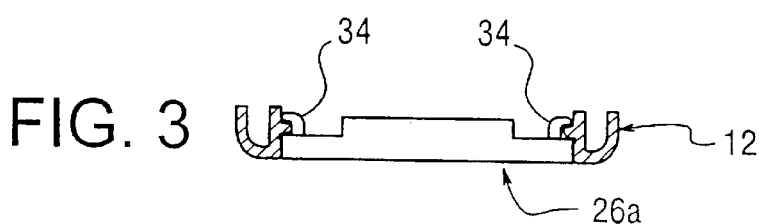
FIG. 3
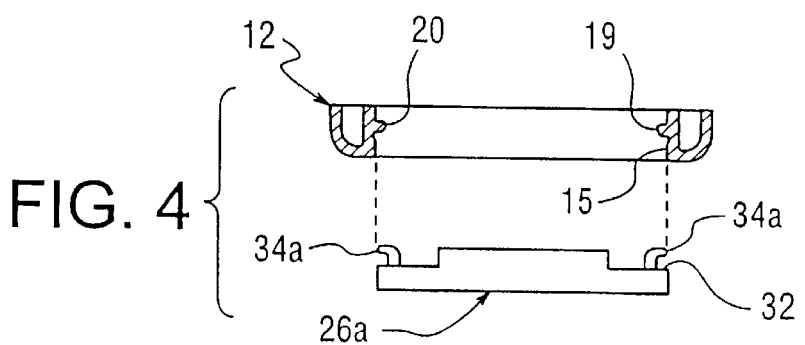
FIG. 4

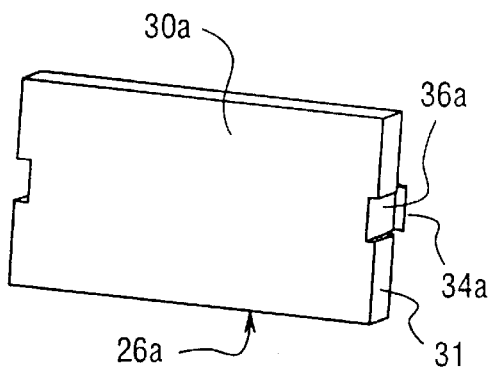
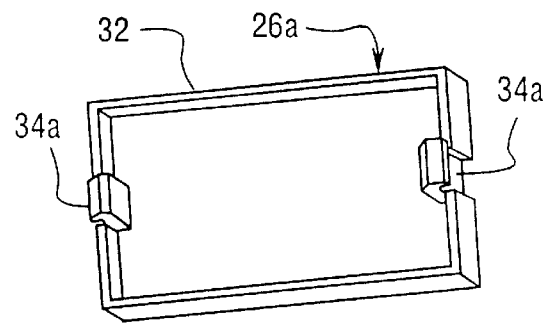
FIG. 7A  FIG. 7B
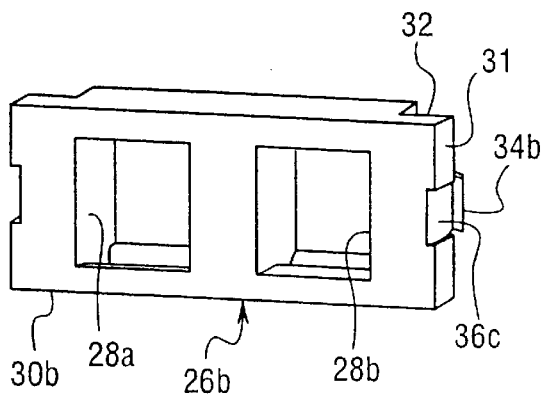
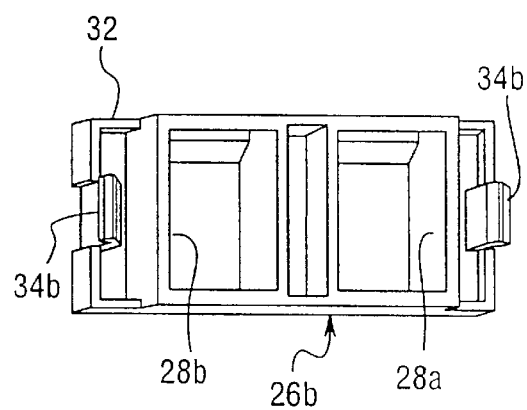
FIG. 8A  FIG. 8B
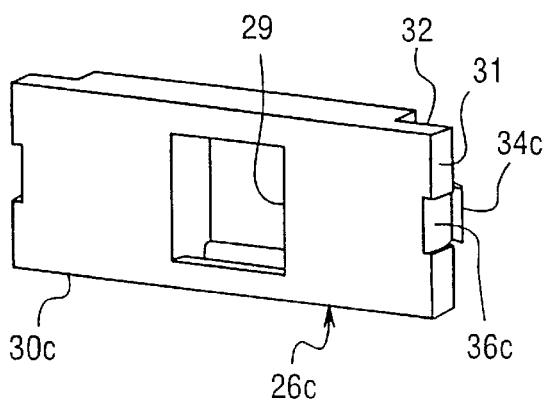
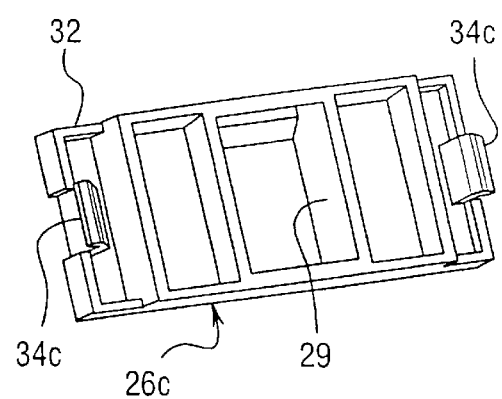
FIG. 9A  FIG. 9B

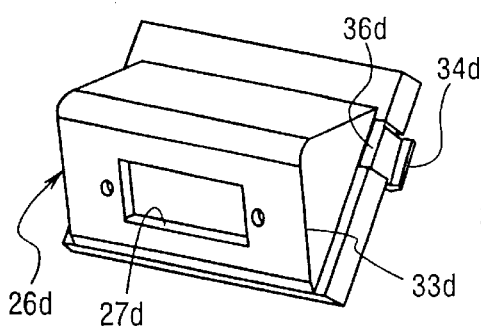
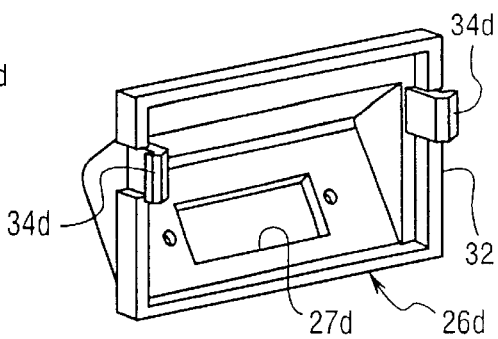
FIG. 10A  FIG. 10B
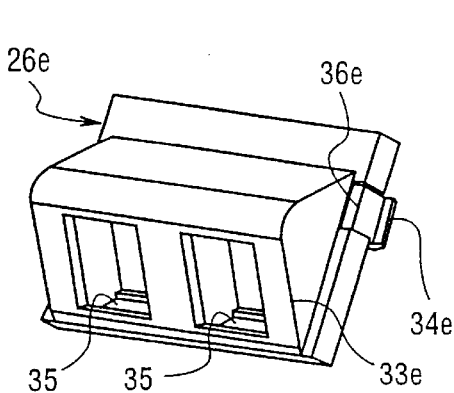
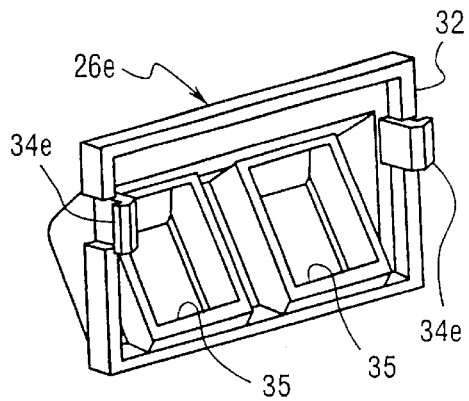
FIG. 11A  FIG. 11B
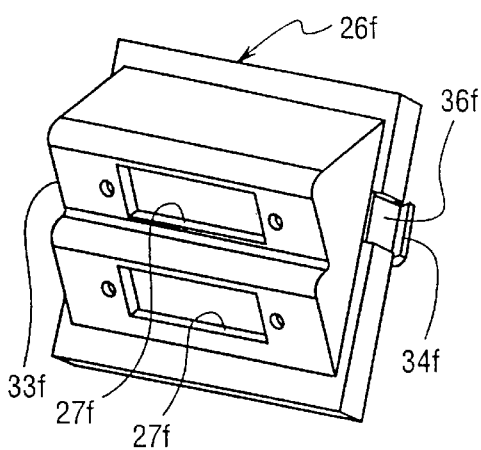
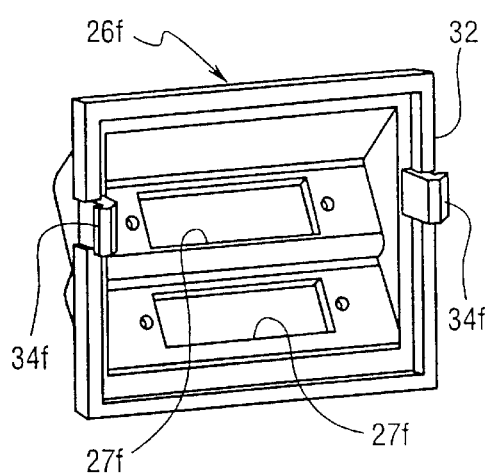
FIG. 12A  FIG. 12B

MODULAR FACEPLATE ASSEMBLY FOR AN
ELECTRICAL BOX

FIELD OF THE INVENTION

The invention relates to a faceplate assembly for an electrical box. More particularly, the invention relates to a faceplate assembly for a telecommunications box. Still more particularly, the invention relates to a faceplate assembly for a telecommunications box having a plate for covering the box, at least one aperture in the plate, at least two modules adapted to fit within the at least one plate aperture, each module having either a blank front face or at least one opening in the front face for accessing a wiring device receptacle contained within the box, and holes in the plate for receiving fasteners for securing the plate to the box. When the plate has been securely fastened to the box, modules may be removed and installed without removing the plate from the box. A wiring device is received by the wiring device receptacle through the opening in the module.

BACKGROUND OF THE INVENTION

Faceplates are widely used in the wiring industry to cover electrical boxes. All electrical boxes are not configured in the same way. For example, an electrical box that has two wiring device receptacles may have the two wiring device receptacles aligned vertically, while another box may have the two wiring device receptacles aligned horizontally. Since existing faceplate assemblies are adapted to be used on only one style electrical box configuration, inventory stores are required to stock two different faceplate assemblies to accommodate the two different electrical box configurations. For a location with many different styles of electrical box configurations, a large inventory of different faceplates is required to cover the wide range of electrical box configurations.

Typically, faceplates must be removed from the electrical box to remove or install an insert that receives a receptacle. This is because the insert is rear loading, i.e., the insert is installed in the faceplate from the rear side. Once the faceplate is removed from the box, the insert may be removed from or installed in the faceplate. Then the faceplate may be refastened to the box. This process is time consuming and inefficient.

Many other existing faceplates utilize inserts that are mechanically fastened to the electrical box. In order to remove or install such an insert, the fasteners must be removed from the insert, which causes the faceplate to be removed from the box in addition to the insert. Once the insert and faceplate have been removed from the box, the insert may be removed from or installed in the faceplate. The faceplate and insert are then aligned with the box, and the insert is refastened to the box. Again, this is a time consuming and inefficient procedure for simply removing or installing a receptacle-receiving insert in a faceplate assembly.

Examples of existing faceplate assemblies are disclosed in the following disclosures: U.S. Pat. No. 5,981,875 to Kesler et al.; U.S. Pat. No. 5,280,135 to Berlin et al.; and Intermatic Weathertight Receptacle Cover Installation Instructions.

Thus, there is a continuing need t provide improved faceplate assemblies.

SUMMARY OF THE INVENTION

Accordingly, it is a primary objective of the invention to provide a faceplate assembly that is compatible with a wide variety of electrical box configurations, thereby reducing the need for maintaining a large inventory of different faceplate assemblies.

Another object of the invention is to provide a faceplate assembly for which the receptacle-receiving insert or module is front loading, thereby eliminating the need to remove the faceplate to remove or install the module.

Another object of the invention is to provide a faceplate assembly having a module that is quickly and easily removed or installed, thereby providing a quick and efficient procedure.

The foregoing objects are basically attainable by providing a faceplate assembly for an electrical box comprising a plate for covering the electrical box, the plate having at least one aperture and a plurality of holes in the plate for connecting the plate to the box with a plurality of fasteners; and at least two modules adapted to fit in the at least one plate aperture, each module having a blank face or at least one opening for accessing a wiring device receptacle in the box with a wiring device.

Other objects, advantages and salient features of the invention will become apparent from the following detailed description, which, taken in conjunction with the annexed drawings, discloses preferred embodiments of the invention.

DRAWINGS

Referring now to the drawings that form a part of the original disclosure:

FIG. 2 is a perspective view of the faceplate assembly shown in FIG. 1 fully assembled and secured to an electrical box;

FIG. 3 is a top plan cross-sectional view of a module positioned within a plate aperture, taken along line 3—3 in FIG. 2;

FIG. 4 is a top plan cross-sectional view similar to FIG. 3 except showing the module about to be positioned within the plate aperture;

FIGS. 7A and 7B are front and rear perspective views of a module having two openings for receiving two wiring devices and two receptacles;

FIGS. 8A and 8B are front and rear perspective views of a module having one opening for receiving a wiring device and a receptacle;

FIGS. 9A and 9B are front and rear perspective views of a module having a blank front face;

FIGS. 10A and 10B are front and rear perspective views of a module having one horizontally oriented opening and a sloped front face;

FIGS. 11A and 11B are front and rear perspective views of a module having two vertically oriented openings and a sloped front face; and FIGS. 12A and 12B are front and rear perspective views of a module having two horizontally oriented openings and a sloped front face.

DETAILED DESCRIPTION OF THE INVENTION

Figure 1:
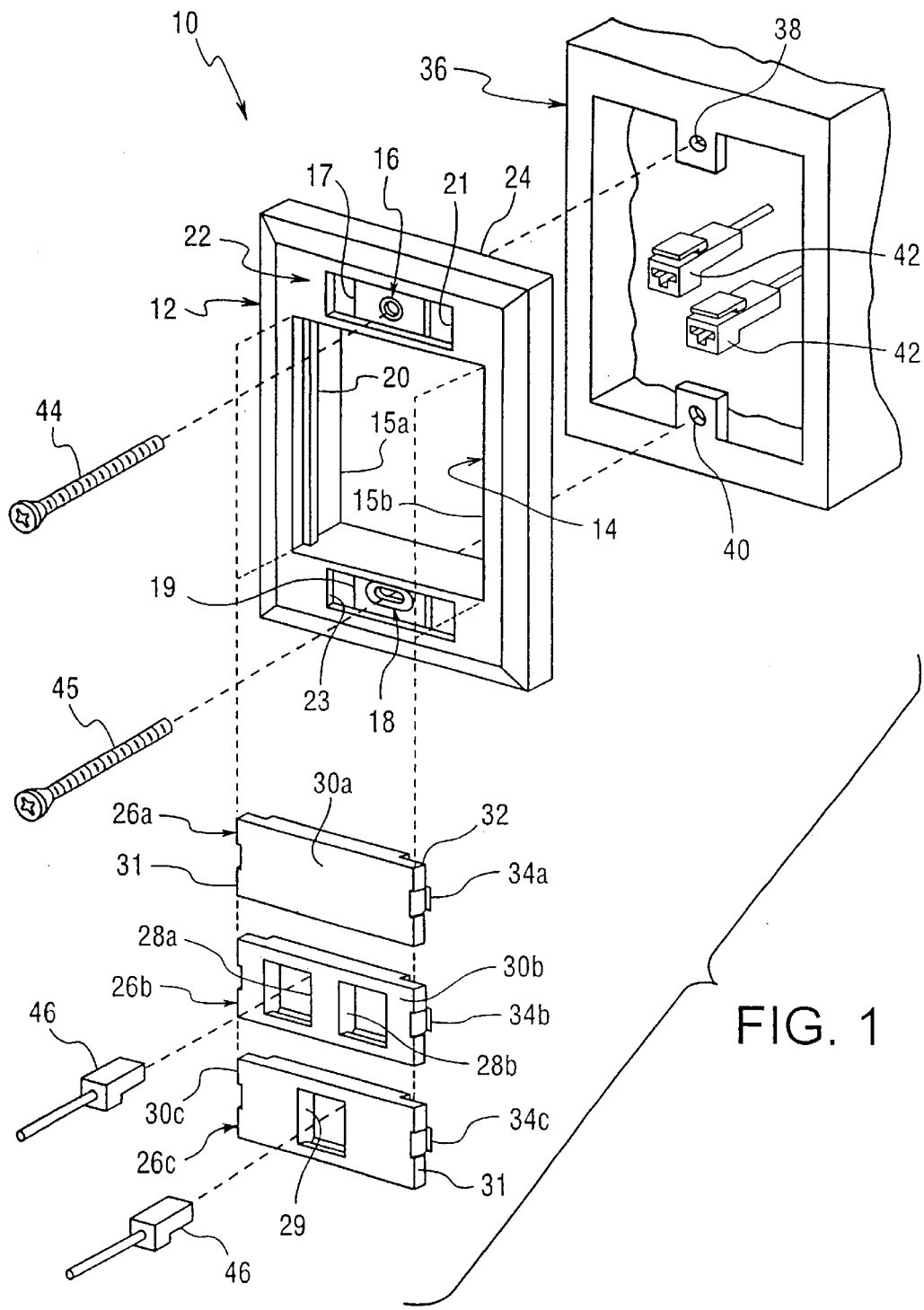
FIG. 1 is an exploded, perspective view of the faceplate assembly, including an electrical box, a wiring device receptacle within the box, a faceplate, two fasteners, three modules, and a wiring device.

As seen in FIGS. 1–2, the faceplate assembly 10 in accordance with the invention comprises a plate 12 for covering the electrical box 36, the plate having at least one aperture 14, and a plurality of holes 16 and 18 in the plate for connecting the plate to the box with a plurality of fasteners 44 and 45, and at least two modules 26a adapted to fit in the at least one plate aperture 14. Modules 26b and 26c can also be received in aperture 14. Module 26a has a blank front face 30a, module 26b has two openings 28a and 28b in the front face for accessing the box with a wiring device 46, and module 26c has one opening 29. As seen by comparing FIGS. 1 and 2, the plate 12 covers the box 36. At least one module 26a, 26b and 26c is received by the at least one plate aperture 14. The front face of each module 26a–c may be blank or have at least one or more openings. A wiring device 46 accesses a wiring device receptacle 42 contained within the electrical box 36 through the opening 28 or 29 in the modules.

The electrical box 36 has an upper fastener hole 38 and a lower fastener hole 40 for aligning with the upper fastener hole 16 and lower fastener hole 18 of the plate 12. The upper and lower fastener holes 16 and 18 are centrally located on upper 17 and lower 19 recessed fastener sections. The upper and lower recessed fastener sections are recessed within upper 21 and lower 23 fastener windows. The box 36 preferably contains at least one wiring device receptacle 42, which typically is a female connector, for example, a female connector for an RJ-45 telecommunications plug. The configuration of the wiring device receptacles 42 within the box is dependent upon the usage requirements at the electrical box's location. If only a single electrical connection is required at the box's location, then only a single wiring device receptacle is required within the box. If several electrical connections are required at the box's location, then a plurality of wiring device receptacles are required within the box. Wiring device receptacles 42 are mounted within the box 36 for providing electrical connections. The wiring devices and receptacles include, but are not limited to, connectors for power, voice, video and data transmissions via electrical or fiber optic lines. Advantageously, the receptacle snaps onto the back of the module and is received in the opening therein, the wiring device also being received in the opening and in the receptacle.

Figures 5A, 5B:
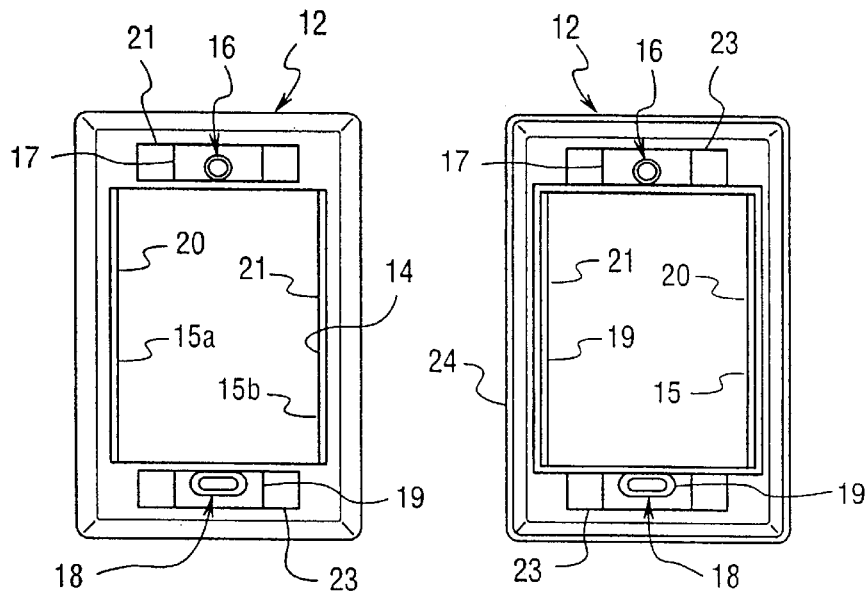
FIGS. 5A and 5B are front and rear elevational views of a single-gang plate in accordance with the invention.

A plate 12 for a single gang electrical box configuration is shown in FIGS. 5A and 5B. The plate 12 has an upper fastener hole 16 and a lower fastener hole 18. Fasteners 44 and 45, such as screws shown in FIG. 1, releasably secure the plate 12 to the box 36. The plate 12 has a front face 22 and a back face 24. An aperture 14 in the plate 12 receives a module 26 through the front face 22 of the plate. Preferably, the aperture 14 is centrally located in the plate 14 and is substantially rectangular. Shoulders 20 and 21 extend inwardly along opposing edges 15 and 15b of the aperture 14.

As shown in FIGS. 5A and 5B, the plate 12 is compatible with a single gang electrical box configuration. In a single gang configuration, the plate 12 has only one aperture 14.

The plate 12 is preferably formed from a resilient plastic material and is preferably unitarily formed from one piece of material.

A module 26b, as shown in FIGS. 8A and 8B, is adapted to fit within the at least one aperture 14 of the plate 12. The module 26b has a front face 30b and a rear face 32. Several modules 26a, 26b and 26c with flat front faces 30a–c are shown in FIGS. 7A–9B. The front face 30a may be blank, as shown in FIGS. 7A and 7B, or the front face may have at least one opening 29, as shown in FIGS. 9A–9B. FIGS. 8A and 8B show a module 26b with two openings 28a and 28b.

Preferably, the flat front faces of module 26a, 26b and 26c are flush with the front face 22 of the plate 12. The openings in the modules are aligned with wiring device receptacles 42 contained within the box 36, as shown in FIG. 1, thereby allowing a wiring device 46 to access a wiring device receptacle through each module opening.

FIGS. 10A–12B show modules having downwardly sloping front faces 33d, 33e and 33f. The downwardly sloping front faces facilitate accessing a wiring device receptacle 42 contained within the box 36 with a wiring device 46. FIGS. 10A–12B also show a first orientation and a second orientation for a module opening. A module is chosen depending on the orientation of the wiring device receptacle contained within the box 36, in addition to the number of wiring device receptacles contained within the box. If a horizontally oriented opening is desired, then a module 26d with a horizontally oriented opening 27d or module 26 and with horizontally oriented openings 27f are selected, as shown in FIGS. 10A, 10B, 12A and 12B. A horizontally oriented opening has a longer horizontal edge than vertical edge. If a vertically oriented opening is desired, then a module 26e with a vertically oriented openings 35 is selected, as shown FIGS. 11A and 11B. A vertically oriented opening has a longer vertical edge than horizontal edge.

As shown in FIGS. 7A–12B, modules 26a, 26b, 26c, 26d, 26e and 26f may have resilient substantially L-shaped projections 34a, 34b, 34c, 34d, 34e and 34f extending away from the front face 30 along opposing edges 31 of the module. The projections 34a, 34b, 34c, 34d, 34e and 34f engage the shoulders 20 and 21 of plate aperture 14 as seen in FIGS. 1 and 3–5 as the module 26a, 26b, 26c, 26d, 26e and 26f are inserted into the plate aperture. The engagement of the projections 34 with the shoulders 20 and 21 creates a snap-fit between the modules and the plate 12, thereby locking the modules in place within the aperture 14. The rear face 32 of the modules rest on the shoulders 20 and 21 of the plate 12 when the projections 34a, 34b, 34c, 34d, 34e and 34f have created a snap-fit with the plate shoulder as seen in FIG. 3. If the module has a flat front face 30a, 30b or 30c as shown in FIG. 2, then the front face of the module is flush with the front face 22 of the plate 12.

The modules 26a, 26b, 26c, 26d, 26e and 26f are preferably made of a resilient plastic and are preferably unitarily formed from one piece of material.

Fasteners 44 and 45, such as screws shown in FIG. 1, are used to secure the plate 12 to the electrical box 36.

As will be appreciated from FIG. 1, a wiring device 46, typically a male connector such as an RJ-45 plug, accesses a wiring device receptacle 42 in the electrical box 36 through the openings in the modules.

Assembly and Disassembly

As shown in FIG. 2, the faceplate assembly 10 is fully assembled and ready to receive a wiring device 46 seen in FIG. 1. The faceplate assembly 10 is assembled by connecting the various parts shown in FIG. 1.

A box 36 with a single gang configuration has upper 38 and lower 40 fastener holes. One or more wiring device receptacles 42 are mounted within the box 36 in a configuration that meets the usage requirements of the location where the box is installed. A plate 12 for a single gang configuration has upper 16 and lower 18 fastener holes. The upper 16 and lower 18 fastener holes of the plate 12 are aligned with the upper 38 and lower 40 fastener holes of the box 36. Fasteners 44 and 45, such as screws, are then inserted into the aligned holes 16 and 38, and 18 and 40 and tightened for securing the plate 12 to the box 36.

Modules 26a, 26b, 26c, 26d, 26e and 26f are then selected based upon the configuration of the wiring device receptacles 42. If two wiring device receptacles are present, then a module 26b having two openings 28a and 28b is selected. If one wiring device receptacle is present, then a module 26c having one opening 28 is selected. If no wiring device receptacles are currently present, then a module 26a having no openings, i.e., a blank front face 30a, is selected. Additionally, a module is selected based upon the orientation of the wiring device receptacles 42 within the box 36. If a wiring device receptacle is oriented horizontally in the box, then a module with a horizontally oriented opening is selected, as shown in FIGS. 10A and 10B. If a wiring device receptacle is oriented vertically in the box, then a module with a vertically oriented opening is selected, as shown in FIGS. 11A and 11B.

A module 26a, 26b, 26c, 26d, 26e and 26f is inserted into a plate aperture 14 through the front face 22 of the plate 12. Projections 34a, 34b, 34c, 34d, 34e and 34f on the modules 26a, 26b, 26c, 26d, 26e and 26f engage the shoulders 19 and 20 of the plate aperture 14 as the modules are pressed into the plate aperture from the front. The projections 34a, 34b, 34c, 34d, 34e and 34f bias outwardly and slide over the aperture shoulders 20 until they snap back inwardly into place, thereby creating a snap-fit between the module 26a, 26b, 26c, 26d, 26e and 26f and the plate 12. The rear face 32 of the module rests upon the aperture shoulders 19 and 20, as shown in FIG. 3. If a module 26a with a flat front face 30a is inserted in a plate aperture 14, then the front face of the module is flush with the front face 22 of the plate.

Just before the modules are snapped into the plate, then wiring device receptacles can be attached to the modules in the openings.

Alternatively, the modules can be snapped into the plate, the wiring device receptacles attached to the modules, and the plate fastened to the box via the screws.

A wiring device 46 may then be inserted into an opening 28 in the module and received by the wiring device receptacle 42 in the electrical box 36.

Since a module 26a, 26b, 26c, 26d, 26e and 26f is placed in the plate aperture 14 through the front face 22 of the plate 12, the module may be removed without having to remove the plate from the box. Pressing inwardly on a projection 34a, 34b, 34c, 34d, 34e and 34f via a thin tool, such as a flat blade screwdriver, disengages that projection from the aperture shoulders 19 and 20. The screwdriver can engage the projection from the front via slots 36a, 36b, 36c, 36d, 36e and 36f on the sides of each module in front of each projection.

When both projections are disengaged, the module may be pulled out of the plate aperture 14. The same module or any other module may be installed simply by pressing the module into the plate aperture 14 until the module projections engage the aperture shoulders 20 and 21, thereby snapping the module into place.

The faceplate assembly 10 of the present invention may be interfaced with enclosures outlined in NEMA OS-1 and OS-2 Outlet/Device Box Specifications. The invention is in full conformance with standards and procedures governing cabling practices outlined in EIA 568A.

Figures 6A, 6B:
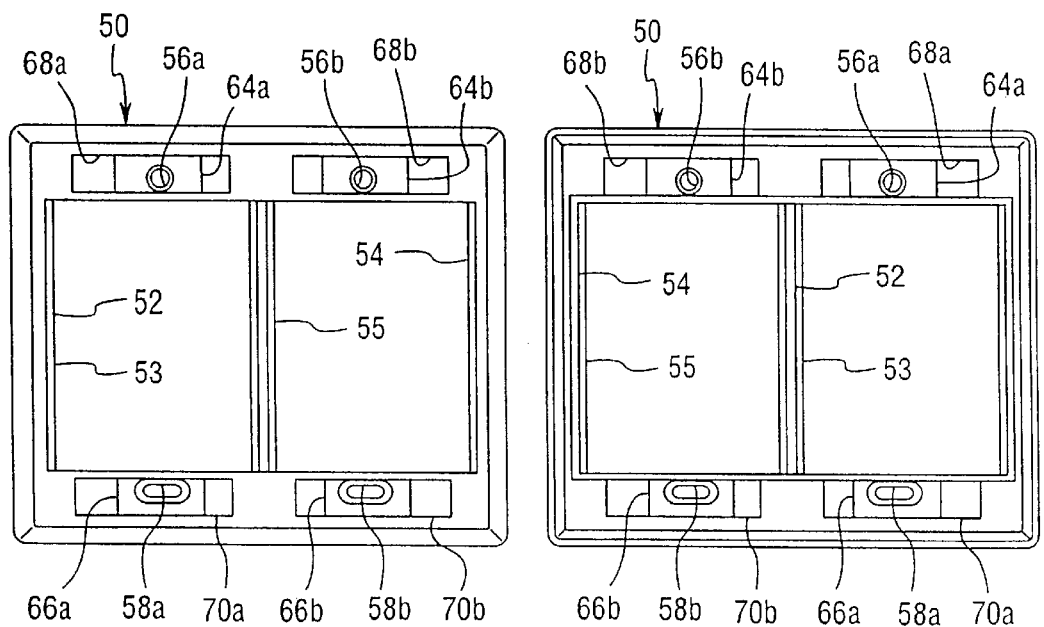
FIGS. 6A and 6B are front and rear elevational views of a double gang plate in accordance with the invention.

Embodiment of FIG. 6A and 6B

In a second embodiment shown in FIGS. 6A and 6B, the plate 50 is compatible with a box having a double gang configuration. For a double gang configuration, the plate 50 has first and second apertures 52 and 54. The first aperture 52 has a first shoulder 53 for receiving at least two modules. The second aperture 54 has a second shoulder 55 for receiving at least two modules. Preferably, the outer perimeter of both apertures 52 and 54 is centrally located on the front face 58 of the plate 50. Preferably, each aperture 52 and 54 is substantially rectangular, and is of a size sufficient to hold three modules 26a, 26b, 26c, 26d, 26e and 26f. The plate 50 has two upper fastener holes 56a and 56b and two lower fastener holes 58a and 58b. Each upper fastener hole 56a and 56b is centrally located on one of two upper recessed fastener sections 64a and 64b. Each lower fastener hole 58a and 58b is centrally located on one of two lower recessed fastener sections 66a and 66b. Both of the upper and both of the lower recessed fastener sections are recessed within a pair of upper and a pair of lower fastener windows 68a and 68b and 70a and 70b.

The assembly and disassembly of a faceplate assembly having a double gang configuration is identical to that of a single gang configuration faceplate assembly 10, with the only differences being the extra fastener holes in the plate 50 and the second aperture in the double gang plate 50. Each aperture in the double gang plate 50 is identical to the single gang plate 12 previously described, such that assembly and disassembly instructions are identical.

Due to the double gang configuration of the electrical box, many more wiring device receptacles may be contained in the box. With the increased number of wiring device receptacles, there is an enormous increase in the number of possible combinations of wiring device receptacles contained within an electrical box. A double gang faceplate assembly covers an electrical box having a double gang configuration, no matter what configuration of wiring device receptacles is used. The use of one faceplate assembly to cover a large variety of double gang electrical boxes greatly reduces the required inventory of faceplate assemblies that was previously required.

While advantageous embodiments have been chosen to illustrate the invention, it will be understood by those skilled in the art that various changes and modifications may be made therein without departing from the scope of the invention as defined in the appended claims.

What is claimed is:

1. A faceplate assembly for an electrical box, comprising:

a plate for covering the electrical box, said plate having at least one aperture, and a plurality of holes for connecting said plate to the box with a plurality of fasteners, said at least one aperture having a shoulder extending inwardly along opposing sides of said at least one aperture;

at least two modules adapted to snap fit in said at least one plate aperture in a first orientation from in front of said plate, each module having front and back faces, said back face of each module rests upon said at least one aperture shoulder, each module having at least one opening extending from said front face to said back face for accessing a wiring device receptacle in the box with a wiring device; and two projections extending from opposing sides of said back face of each of said at least two modules for engaging said shoulders of said at least one plate aperture and creating a snap fit between said plate and each of said at least two modules.

2. The assembly of claim 1, wherein
said at least two modules have a slot proximal each projection for accessing said projection for disengaging said projection from said aperture shoulder.

3. The assembly of claim 1, wherein
said plate has a front face, and said front face of said at least two modules is flush with said front face of said plate.

4. The assembly of claim 1, wherein
said front face of said at least two modules has a downward sloping angle for facilitating accessing the wiring device receptacle in the electrical box by the wiring device.

5. The assembly of claim 1, wherein
said at least one module opening is oriented in a first direction for facilitating accessing the wiring device receptacle in the electrical box with the wiring device.

6. The assembly of claim 1, wherein
said at least one module opening is oriented in a second direction for facilitating accessing the wiring device receptacle in the electrical box with a wiring device.

7. The assembly of claim 1, wherein
said at least one plate aperture is substantially rectangular.

8. The assembly of claim 1, wherein
said at least one plate aperture is of a size sufficient to hold at least two modules.

9. The assembly of claim 1, wherein
said plate comprises a resilient plastic material.

10. The assembly of claim 1, wherein
said at least two modules comprise a resilient plastic material.

11. The assembly of claim 1, wherein
the electrical box is a telecommunications box.

12. A faceplate assembly for an electrical box, comprising:
   a plate for covering the electrical box, said plate having front and back faces, said plate having at least one aperture, a shoulder extending inwardly along opposing sides of said at least one aperture, and a plurality of holes for connecting said plate to the box with a plurality of fasteners; and
   at least two modules adapted to fit in said at least one plate aperture in a first orientation, said at least two modules having front and back faces, said back face of said at least two modules resting upon said shoulder of said at least one aperture, at least one opening extending from said front face to said back face of said at least two modules for accessing a wiring device receptacle in the box with a wiring device, and two projections extending from opposing sides of said back face of said at least two modules for engaging the shoulders of said at least one plate aperture and creating a snap fit between said plate and said at least two modules.

13. The assembly of claim 12, wherein said at least two modules have a slot proximal each projection for accessing said projection for disengaging said projection from said aperture shoulder.

14. The assembly of claim 12, wherein said front face of said at least two modules is flush with said front face of said plate.

15. The assembly of claim 12, wherein said front face of said at least two modules has a downward sloping angle for facilitating accessing the wiring device receptacle in the electrical box with the wiring device.

16. The assembly of claim 12, wherein said at least two modules opening is oriented in a second direction for facilitating accessing the wiring device receptacle in the electrical box with the wiring device.

17. The assembly of claim 12, wherein said at least one plate aperture is substantially rectangular.

18. The assembly of claim 12, wherein said at least one plate aperture is of a size sufficient to hold at least two modules.

19. The assembly of claim 12, wherein the electrical box is a telecommunications box.

20. The assembly of claim 12, wherein said plate comprises a resilient plastic material.

21. The assembly of claim 12, wherein said at least two modules comprise a resilient plastic material.

22. A faceplate assembly for a telecommunications box, comprising:
   a plate for covering the telecommunications box, said plate having front and back faces, said plate having at least one substantially rectangular aperture, a shoulder extending inwardly along opposing sides of said aperture, and a plurality of holes for connecting said plate to the box with a plurality of fasteners; and
   three modules adapted to fit in each said at least one plate aperture in a first orientation, each module having front and back faces, said back face of each module resting upon said aperture shoulder, at least one hole in said front face extending from said module front face to said module back face for accessing the telecommunications device receptacle in the box with a telecommunications device, and two projections extending from opposing sides of said back face of each module for engaging said shoulders of said at least one plate aperture and creating a snap fit between said plate and each module.

23. The assembly of claim 22, wherein said front face of each module is flush with said front face of said plate.

24. The assembly of claim 22, wherein said front face of each module has a downward sloping angle for facilitating accessing the telecommunications device receptacle in the electrical box with the wiring device.

25. The assembly of claim 22, wherein each module opening is oriented in a second direction for facilitating accessing the telecommunications device receptacle in the telecommunications box with the telecommunications device.

26. The assembly of claim 22, wherein said plate comprises a resilient plastic material.

27. The assembly of claim 22, wherein each module comprises a resilient plastic material.

28. The assembly of claim 22, wherein said at least two modules have a slot proximal each projection for accessing said projection for disengaging said projection from said aperture shoulder.

* * * * *